United States Patent [19]
Darr et al.

[11] Patent Number: 5,766,712
[45] Date of Patent: Jun. 16, 1998

[54] COEXTRUDED MULTILAYER PLASTIC BLOW MOLDED CONTAINER

[75] Inventors: Richard C. Darr, Seville; Michael C. Kitzmiller, Fort Loramie, both of Ohio

[73] Assignee: Plastipak Packaging, Inc., Plymouth, Mich.

[21] Appl. No.: 837,241

[22] Filed: Feb. 14, 1992

[51] Int. Cl.$^6$ .................................................. B29D 22/00
[52] U.S. Cl. .................. 428/36.91; 428/35.7; 428/516; 428/903.3; 428/212; 215/1 C
[58] Field of Search ................ 428/35.7, 516, 428/903.3, 212, 36.91; 215/1 C

[56] References Cited

U.S. PATENT DOCUMENTS

| | | | |
|---|---|---|---|
| 3,878,282 | 4/1975 | Bonis et al. | 264/97 |
| 4,174,413 | 11/1979 | Yasuike et al. | 428/35.7 |
| 4,289,817 | 9/1981 | Vaxyl | 428/35.7 |
| 4,391,861 | 7/1983 | Nilsson | 428/35.7 |
| 4,808,482 | 2/1989 | Benge et al. | 428/411.1 |
| 4,925,711 | 5/1990 | Akao et al. | 428/35.2 |
| 4,999,254 | 3/1991 | Ofstein | 428/518 |
| 5,049,449 | 9/1991 | Ofstein | 428/476.1 |
| 5,064,724 | 11/1991 | Ofstein | 428/501 |

Primary Examiner—James J. Seidleck
Assistant Examiner—Michael A. Williamson
Attorney, Agent, or Firm—Brooks & Kushman P.C.

[57] ABSTRACT

A plastic blow molded container (10) including a coextruded blow molding (12) has a wall (22) including: (a) an inner layer (26) of a virgin plastic; (b) an inner intermediate layer (28) of recycled plastic which is relatively dark; (c) an outer intermediate layer (30) of an opaque plastic that visually hides the dark recycled plastic; and (d) an outer layer (32) of a pigmented plastic of a lighter color which is not visually distorted by the darker inner intermediate layer (28) of recycled plastic due to the opaqueness of the outer intermediate layer (30). Titanium dioxide is preferably utilized to provide the opaqueness of the outer intermediate layer (30) in order to visually block the darker color of the recycled plastic of the inner intermediate layer (28). The inner layer (26) of virgin plastic, the outer intermediate layer (30) of opaque plastic and the outer layer (32) of pigmented plastic each has a thickness that is at least about 0.1 of the total thickness of the wall, and the inner intermediate layer (28) of recycled plastic normally will have a thickness on the order of about 0.55 to 0.65 of the total thickness of the wall. The construction of the container has particular utility when the wall 22 including each of its layers is made of high density polyethylene.

6 Claims, 1 Drawing Sheet

COEXTRUDED MULTILAYER PLASTIC BLOW MOLDED CONTAINER

TECHNICAL FIELD

This invention relates to a plastic blow molded container.

BACKGROUND ART

Plastic blow molded containers have previously been made by coextruding a hot plastic parison with different layers and then blowing the parison within a mold. Such coextrusion allows the use of recycled plastic which promotes energy efficiency and provides a positive environmental effect by reusing the plastic instead of dumping it in a landfill. One problem that has resulted from attempted usage of recycled plastic is that it often has a dark color that shows through a lighter pigmented outer plastic layer of the coextruded container.

DISCLOSURE OF INVENTION

An object of the present invention is to provide an improved plastic blow molded container which can utilize recycled plastic even when the recycled plastic has a relatively dark color and is to be utilized with an outer layer of a pigmented plastic of a lighter color.

In carrying out the above object, a plastic blow molded container constructed in accordance with the present invention includes a coextruded blow molded container of a hollow construction having a wall which includes an inner layer of virgin plastic that is contacted by a product received within the container so that the product is not contaminated by any recycled plastic. The wall also has an inner intermediate layer of recycled plastic which has a first color. An outer intermediate layer of the wall is of an opaque plastic that visually hides the color of the recycled plastic layer, and an outer layer of the wall is of a pigmented plastic of a lighter color than the inner intermediate layer of recycled plastic. The darker color of the inner intermediate layer of recycled plastic is visually blocked by the opaque plastic of the outer intermediate layer so as not to visually distort the lighter color of the pigmented plastic of the outer layer. Such a construction of the plastic blow molded container allows a product to be uncontaminated by the recycled plastic as mentioned above as well as allowing the use of dark recycled plastic even when a relatively light color of the outer container surface is desired.

In the preferred construction of the blow molded container, the opaque plastic of the outer intermediate layer includes titanium dioxide which provides the opaqueness that visually blocks the darker color of the recycled plastic of the inner intermediate layer so as not to visually distort the lighter color of the pigmented plastic of the outer layer.

In its preferred construction, the inner layer of virgin plastic, the outer intermediate layer of opaque plastic and the outer layer of pigmented plastic each has a thickness that is at least about 0.1 of the total thickness of the wall. Furthermore, the inner intermediate layer of recycled plastic preferably has a thickness that is in the range of about 0.55 to 0.65 of the total thickness of the wall.

Each layer of the container in the preferred construction is made from high density polyethylene which is a plastic for which the invention has particular utility.

The objects, features and advantages of present invention are readily apparent from the following detailed description of the best mode for carrying out the invention when taken in connection with the accompanying drawings.

2

BEST MODE FOR CARRYING OUT THE INVENTION

Figure 1:
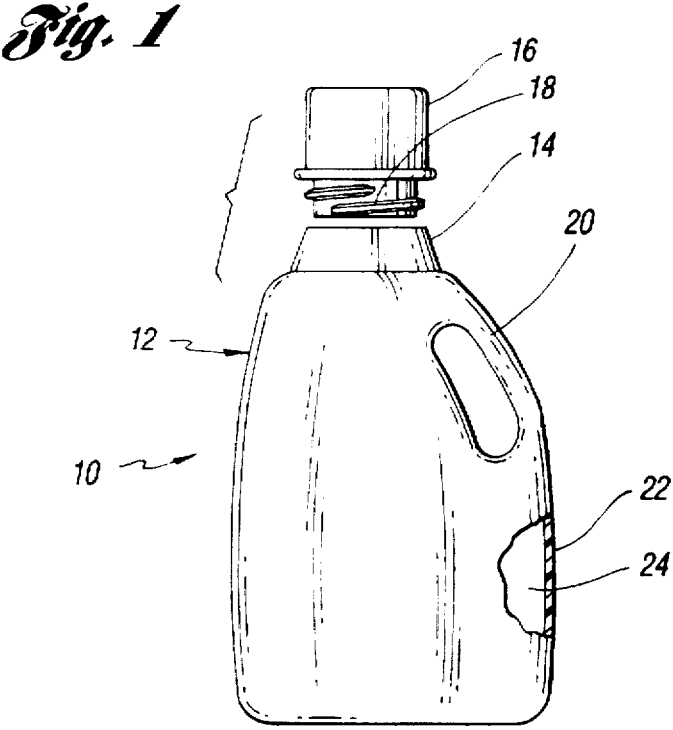
FIG. 1 is a partially broken away view of a plastic blow molded container that is constructed in accordance with the present invention and shown with a closure that is utilized with the container.

With reference to FIG. 1 of the drawings, a plastic blow molded container generally indicated by 10 includes a coextruded blow molding 12 that is constructed as a bottle of a hollow construction having an upper dispensing spout 14. A measuring cup closure 16 is preferably utilized with the bottle 12, and the dispensing spout 14 is preferably of the drain-back type so that excess liquid contents in the measuring cup closure 16 drain back into the interior of the bottle upon securement to the dispensing spout 14 by suitable threads 18 of the measuring cup closure and associated threads within the interior of the dispensing spout. As illustrated, the bottle also includes a handle 20 so that relatively large volumes can be easily handled.

Figure 2:
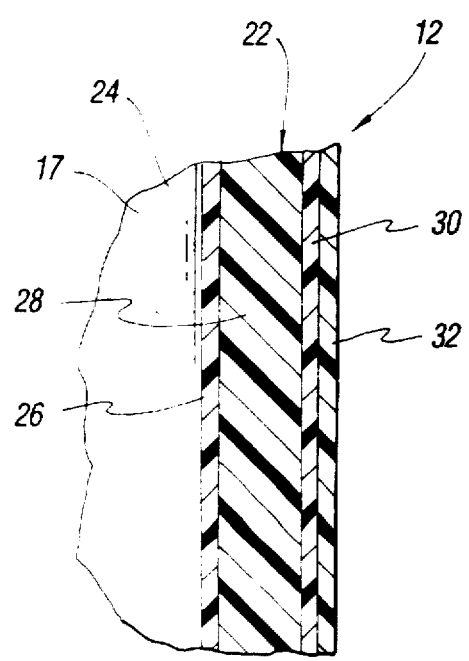
FIG. 2 is a partial sectional view of a wall of the blow molded container illustrating its construction.

As best illustrated in FIG. 2, the blow molding 12 includes a wall 22 that defines the shape of the bottle around its interior 24 in which a product is packaged such as liquid detergent. This wall 22 is coextruded from four layers of plastic as are hereinafter more fully described. These extruded plastic layers provide a hot parison which is then blown within a mold to provide the container with the desired shape and construction.

With continuing reference to FIG. 2, the coextruded wall 22 of the blow molding includes an inner layer 26 of a virgin plastic that is contacted by the product that is received within the container. Wall 22 also includes an inner intermediate layer 28 of recycled plastic which has a first color that often times is relatively dark, such as green, upon mixing of all of the colored plastics which are combined during the recycling. Wall 22 further includes an outer intermediate layer 30 of an opaque plastic that visually hides the color of the recycled plastic. At its exterior, the wall 22 includes an outer layer 32 of a pigmented plastic of a lighter color than the inner intermediate layer 28 of recycled plastic. The darker color of the inner intermediate layer 28 of recycled plastic is visually blocked by the opaque plastic of the outer intermediate layer 30 so as not to visually distort the lighter color of the pigmented plastic of the outer layer 32.

In the preferred construction of the blow molded container, the opaque plastic of the outer intermediate layer 30 includes titanium dioxide which provides the opaqueness that visually blocks the darker color of the recycled plastic of the inner intermediate layer 28 so as not to visually distort the lighter color of the pigmented plastic of the outer layer 32.

Best results are achieved when the inner layer 26 of virgin plastic, the outer intermediate layer 30 of opaque plastic and the outer layer 32 of pigmented plastic each has a thickness that is at least about 0.1 of the total thickness of the wall. Each of these layers 26, 30 and 32 is kept as relatively thin as possible so as to permit the greatest possible amount of recycled plastic in the inner intermediate layer 28, which normally will be in the order of about 0.55 to 0.65 of the total thickness.

The construction of the container has particular utility when the wall 22 including each of its layers 26, 28, 30 and 32 is high density polyethylene.

Also, the titanium dioxide utilized to provide the opaqueness of the outer intermediate layer 30 is available from Ampacet Corporation of Tarrytown, New York, United States of America under the description Blue White PE MB and the product code 11744. This will function satisfactorily when relatively dark recycled plastic is used for the inner intermediate layer 28, even when the outer layer 32 of pigmented plastic has a relatively light color such as an orange that results from the use of a color concentrate available from Americhem, Inc. of Cuyahoga Falls, Ohio, United States of America under the product designation 21249-RllG Orange Concentrate.

It should also be noted that the term "darker" color is herein used to mean those colors that will cause the visual color distortion involved of lighter colors, and the term "lighter" color is herein used to mean those colors that are visually distorted in the manner involved by darker colors.

While the best mode for carrying out the invention has been described in detail, those familiar with the art to which this invention relates will recognize various alternative ways of practicing the invention as defined by the following claims.

What is claimed is:

1. A plastic blow molded container of a hollow construction, comprising: a coextruded blow molding including a wall having:
   (a) an inner layer of virgin plastic that is contacted by a product received within the container;
   (b) an inner intermediate layer of recycled plastic which has a first color;
   (c) an outer intermediate layer of an opaque plastic that visually hides the color of the recycled plastic layer; and
   (d) an outer layer of a pigmented plastic of a lighter color than the inner intermediate layer of recycled plastic, and the darker color of the inner intermediate layer of recycled plastic being visually blocked by the opaque plastic of the outer intermediate layer so as not to visually distort the lighter color of the pigmented plastic of the outer layer.

2. A plastic blow molded container as in claim 1 wherein the opaque plastic of the outer intermediate layer includes titanium dioxide which provides the opaqueness that visually blocks the darker color of the recycled plastic of the inner intermediate layer so as not to visually distort the lighter color of the pigmented plastic of the outer layer.

3. A plastic blow molded container as in claim 1 wherein the inner layer of virgin plastic, the outer intermediate layer of opaque plastic and the outer layer of pigmented plastic each has a thickness that is at least about 0.1 of the total thickness of the wall, and the inner intermediate layer of recycled plastic having a thickness in the range of about 0.55 to 0.65 of the total thickness of the wall.

4. A plastic blow molded container as in claim 1 wherein each layer is high density polyethylene.

5. A plastic blow molded container of a hollow construction, comprising: a coextruded blow molding including a wall having:
   (a) an inner layer of virgin plastic that is contacted by a product received within the container and that has a thickness of at least about 0.1 of the total thickness of the wall;
   (b) an inner intermediate layer of recycled plastic which has a first color;
   (c) an outer intermediate layer of plastic including titanium dioxide that provides opaqueness that visually hides the color of the recycled plastic layer, and said outer intermediate layer having a thickness that is at least about 0.1 of the total thickness of the wall; and
   (d) an outer layer of a pigmented plastic of a lighter color than the inner intermediate layer of recycled plastic, the darker color of the inner intermediate layer of recycled plastic being visually blocked by the opaqueness of the plastic of the outer intermediate layer so as not to visually distort the lighter color of the pigmented plastic of the outer layer, and the outer layer of pigmented plastic having a thickness that is at least about 0.1 of the total thickness of the wall.

6. A plastic blow molded container of a hollow construction, comprising: a coextruded blow molding including a wall having:
   (a) an inner layer of virgin high density polyethylene plastic that is contacted by a product received within the container and that has a thickness at least about 0.1 of the total thickness of the wall;
   (b) an inner intermediate layer of recycled high density polyethylene plastic which has a first color;
   (c) an outer intermediate layer of high density polyethylene plastic including titanium dioxide that provides opaqueness that visually hides the color of the recycled plastic layer, and said outer intermediate layer having a thickness that is at least about 0.1 of the total thickness of the wall; and
   (d) an outer layer of a pigmented high density polyethylene plastic of a lighter color than the inner intermediate layer of recycled plastic, the color of the inner intermediate layer of recycled plastic being visually blocked by the opaqueness of the plastic of the outer intermediate layer so as not to visually distort the lighter color of the pigmented plastic of the outer layer, and the outer layer of pigmented plastic having a thickness that is at least about 0.1 of the total thickness of the wall.

* * * * *

UNITED STATES PATENT AND TRADEMARK OFFICE
CERTIFICATE OF CORRECTION

PATENT NO. : 5,766,712
DATED : June 16, 1998
INVENTOR(S) : Richard C. Darr, et al.

It is certified that error appears in the above-identified patent and that said Letters Patent is hereby corrected as shown below:

Column 4, line 45, insert --darker-- after "the" (first occurrence) and before "color".

Signed and Sealed this

Twenty-second Day of September, 1998

*Attest:*

BRUCE LEHMAN

*Attesting Officer*         *Commissioner of Patents and Trademarks*